United States Patent
Cho et al.

(10) Patent No.: US 8,625,514 B2
(45) Date of Patent: Jan. 7, 2014

(54) METHOD FOR TRANSMITTING CSG ID IN A WIRELESS COMMUNICATION SYSTEM

(75) Inventors: Hee Jeong Cho, Anyang-si (KR); Doo Hyun Sung, Anyang-si (KR); Yong Ho Kim, Anyang-si (KR); Jin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 13/142,840

(22) PCT Filed: Dec. 23, 2009

(86) PCT No.: PCT/KR2009/007713
§ 371 (c)(1),
(2), (4) Date: Jun. 29, 2011

(87) PCT Pub. No.: WO2010/079909
PCT Pub. Date: Jul. 15, 2010

(65) Prior Publication Data
US 2011/0268034 A1 Nov. 3, 2011

Related U.S. Application Data

(60) Provisional application No. 61/143,418, filed on Jan. 9, 2009.

(30) Foreign Application Priority Data

Jun. 5, 2009 (KR) .................. 10-2009-0049811

(51) Int. Cl.
*H04W 4/00* (2009.01)
(52) U.S. Cl.
USPC ............ 370/329; 370/349; 370/350; 455/434

(58) Field of Classification Search
USPC ................ 370/328, 329, 332, 341, 349, 350; 714/758; 455/434
See application file for complete search history.

(56) References Cited

U.S. PATENT DOCUMENTS

| 6,529,491 | B1 | 3/2003 | Chang et al. | |
|---|---|---|---|---|
| 2009/0270096 | A1* | 10/2009 | Somasundaram et al. | 455/434 |
| 2010/0153816 | A1* | 6/2010 | Li et al. | 714/758 |
| 2010/0165942 | A1* | 7/2010 | Liao et al. | 370/329 |

FOREIGN PATENT DOCUMENTS

| CN | 101287294 | 10/2008 |
|---|---|---|
| CN | 101291249 | 10/2008 |
| JP | 2010-520712 | 6/2010 |

(Continued)

OTHER PUBLICATIONS

Jeong et al., "LTE Femtocell," The KICS, v.25, No. 9, pp. 41-48, Sep. 2008.

(Continued)

*Primary Examiner* — Jeffrey M Rutkowski
*Assistant Examiner* — Harun Chowdhury
(74) *Attorney, Agent, or Firm* — Lee, Hong, Degerman, Kang & Waimey (57) ABSTRACT

A method for transmitting a Closed Subscriber Group (CSG) Identifier (ID) in a wireless communication system is disclosed. The method includes information about a number of one or more CSG IDs that the BS has and information about a list of the one or more CSG IDs in a Secondary-SuperFrame Header (S-SFH), and transmitting the S-SFH.

8 Claims, 4 Drawing Sheets

(56) References Cited

FOREIGN PATENT DOCUMENTS

| WO | 2008/081816 | 7/2008 |
|----|-------------|--------|
| WO | 2008112161 | 9/2008 |
| WO | 2008/134281 | 11/2008 |
| WO | 2008/157817 | 12/2008 |

OTHER PUBLICATIONS

3rd Generation Partnership Project (3GPP), "Technical Specification Group Radio Access Networks; 3G Home NodeB Study Item Technical Report (Release 8)," 3GPP TR 25.820 v8.2.0, Sep. 2008.

Park et al., "Proposal for IEEE 802.16m Synchronization Channel," IEEE C802.16m-08/286r2, Jul. 2008.

The State Intellectual Property Office of the People's Republic of China Application Serial No. 200980154220.7, Office Action dated Jul. 1, 2013, 7 pages.

* cited by examiner

METHOD FOR TRANSMITTING CSG ID IN A WIRELESS COMMUNICATION SYSTEM

CROSS-REFERENCE TO RELATED APPLICATIONS

This application is a 371 U.S. national stage application of International Application No. PCT/KR2009/007713, filed on Dec. 23, 2009, which claims the benefit of earlier filing date and right of priority to Korean Application No. 10-2009-0049811, filed on Jun. 5, 2009, and U.S. Provisional Application Ser. No. 61/143,418, filed on Jan. 9, 2009, the contents of which are hereby incorporated by reference herein in their entirety.

TECHNICAL FIELD

The present invention relates to a wireless communication system, and more particularly, to a method for transmitting a Closed Subscriber Group (CSG) ID in a wireless communication system including femtocells.

BACKGROUND ART

Technologies concerning femtocell Base Stations (BSs) supporting indoors or shadowing areas that are not supported by macro cells have recently been defined. A femtocell BS is an ultra small, low-power indoor BS and a femtocell is the coverage area of a femtocell BS. Although a femtocell is conceptually similar to a pico cell, a femtocell BS is an advanced BS relative to a pico cell BS, in terms of functionality. The femtocell BS is a small cellular BS connected to a broadband router, for transmitting data to a backbone network of a mobile communication service provider via a Digital Subscriber Line (DSL) link or the like. The term "femtocell" is a combination of the term "femto" representing 1 divided by ten followed by 15 zeroes and the term "cell" representing a service coverage unit of mobile communications. The use of femtocells increases communication quality through efficient conjunction between a wired link and a wireless link. As a femtocell transmits mobile communication data directly from a BS to an exchange without the intervention of an indoor relay, a communication service provider may reduce a frequency load, while minimizing network configuration cost.

There are largely two types of femtocell BSs, CSG femtocell BS and Open Subscriber Group (OSG) femtocell BS. An OSG femtocell BS is accessible to all MSs, whereas a CSG femtocell BS is accessible only to MSs of a group to which a CSG ID of the femtocell BS is allocated.

An open access mode, a closed access mode, and a hybrid access mode are defined for operations of a CSG BS.

When a femtocell BS is in the open access mode, it is accessible to all users. An MS performs initial entry to the femtocell BS without comparing a CSG Identifier (ID) received from the femtocell BS with a user CSG list of the MS. The user CSG list lists CSG IDs of femto cells accessible to the MS, managed by the MS.

In the closed access mode, the femtocell BS is accessible only to specific users. Hence, the MS performs initial entry to the femtocell BS only if a CSG ID received from the femtocell BS is present in the user CSG list of the MS.

As is implied from its appellation, the hybrid access mode allows for both the open and closed access modes.

There may exist a femtocell accessible MSs with a first CSG ID and MSs with a second CSG ID. How to allocate a CSG ID to this femtocell and which MSs to notify of the CSG ID become issues to be solved.

Figure 1:
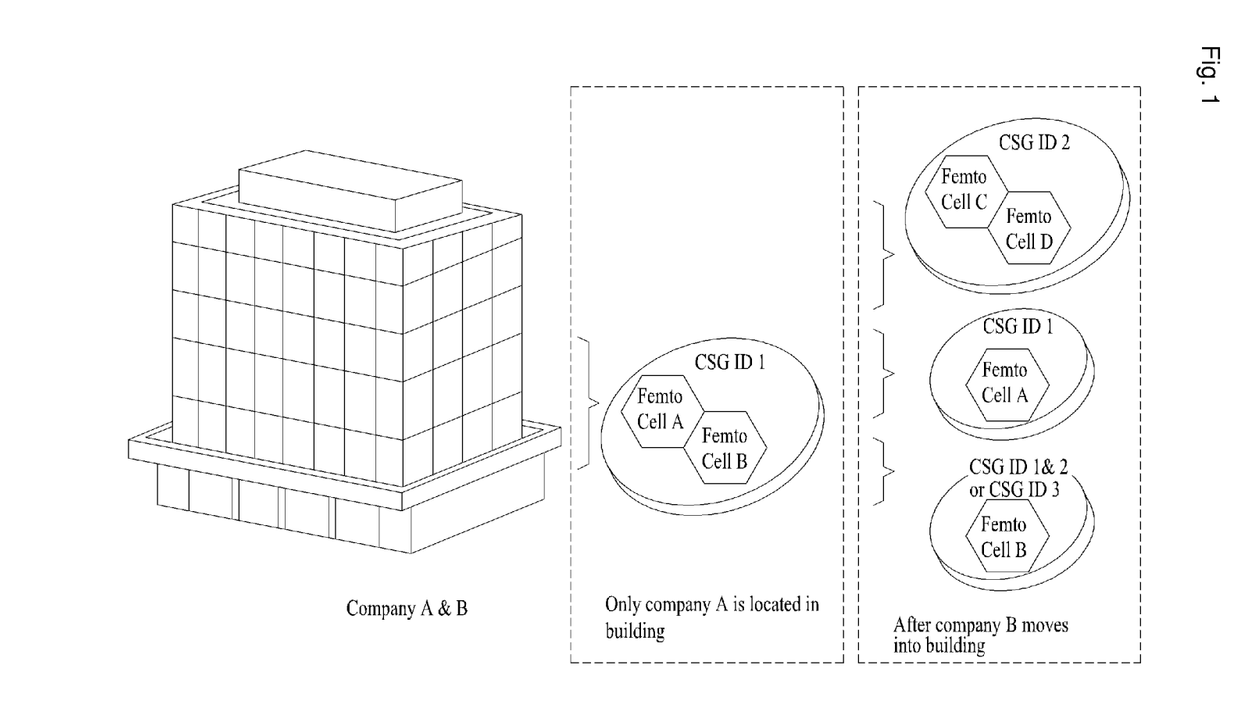
FIG. 1 illustrates a scenario in which Company B moves into a building with Company A already located therein and a Closed Subscriber Group (CSG) ID should be allocated to a femtocell that workers of both Company A and Company B should access.

FIG. 1 illustrates a scenario in which Company B moves into a building with Company A already located therein and a CSG ID should be allocated to a femtocell that workers of both Company A and Company B should access.

Referring to FIG. 1, when only Company A is located in the building, workers of Company A can access Femtocell A and Femtocell B, and the CSG IDs of Femtocell A and Femtocell B are both CSG ID 1. Then Company B moves into the building and workers of Company B should be able to access Femtocell C, Femtocell D and Femtocell B. Specifically, Femtocell B covers an area which all workers of Company A and Company B should be able to access, such as a lobby.

Accordingly, there exists a need for a method for allocating a CSG ID to Femtocell B and notifying an MS of the allocated CSG ID.

DISCLOSURE OF INVENTION

Technical Problem

As described above, there exists a need for a method for allocating a CSG ID to a femtocell accessible to all of MSs with a first CSG ID and MSs with a second CSG ID and notifying the MSs of the allocated CSG ID. In this regard, a new CSG ID may be allocated to the femtocell or both of the first and second CSG IDs may be allocated to the femto cell.

An object of the present invention devised to solve the problem lies on a method for transmitting a plurality of CSG IDs to an MS by a femtocell BS having the plurality of CSG IDs.

Another object of the present invention devised to solve the problem lies on a method for notifying an MS of a new CSG ID, when the new CSG ID is allocated to a femtocell accessible to all of MSs with a first CSG ID and MSs with a second CSG ID.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method for transmitting at least one CSG ID in a BS in a wireless communication system including femtocells, which includes including information about a number of one or more CSG IDs that the BS has and information about a list of the one or more CSG IDs in an S-SFH, and transmitting the S-SFH.

In another aspect of the present invention, provided herein is a method for receiving at least one CSG ID in an MS in a wireless communication system including femtocells, which includes receiving from a BS an S-SFH including information about a number of one or more CSG IDs that the BS has and information about a list of the one or more CSG IDs, and performing network entry based on the information about the list of the one or more CSG IDs.

In another aspect of the present invention, provided herein is a method for transmitting a CSG ID of a neighbor BS in a BS in a wireless communication system including femtocells, which includes transmitting the CSG ID of the neighbor BS to MSs within an area of the BS by a broadcast message, and transmitting the CSG ID of the neighbor BS to MSs that fail to receive the CSG ID of the neighbor BS among the MSs within the area of the BS by a unicast message.

In a further aspect of the present invention, provided herein is a method for receiving a CSG ID of a neighbor BS in an MS in a wireless communication system including femtocells, which includes receiving a CSG ID of a neighbor BS accessible to the MS from a BS, and registering the CSG ID of the neighbor BS in a user CSG list.

Advantageous Effects of Invention

Embodiments of the present invention have the following effects.

A femtocell BS with a plurality of CSG IDs can efficiently notify an MS of the plurality of CSG IDs.

If a new CSG ID is allocated to a neighbor BS, the new CSG ID is notified to an MS so that the MS may perform network entry into the neighbor BS.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Through the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination of both.

Methods for transmitting a plurality of Closed Subscriber Group (CSG) IDs to a Mobile Station (MS) according to embodiments of the present invention will be described below.

In accordance with an embodiment of the present invention, a Base Station (BS) adds a 'Number of CSG ID' field to a first Secondary-SuperFrame Header (S-SFH) subpacket and a 'CSG ID list' filed to a second S-SFH subpacket and transmits the first and second S-SFH packets to an MS. The 'Number of CSG ID' field indicates the number of CSG IDs that a femtocell BS has, and the 'CSG ID list' field indicates a list of the CSG IDs that the femtocell BS has. The length of the 'CSG ID list' field is determined according to a value of the 'Number of CSG ID' field.

If the 'Number of CSG ID' field is set to 0, this means that the 'CSG ID list' is not included. For example, if the BS has a CSG ID, CSG ID A, the 'Number of CSG ID' field is set to 1 and the 'CSG ID list' field indicates A. If the BS has two CSG IDs, CSG ID A and CSG ID B, the 'Number of CSG ID' field is set to 2 and the 'CSG ID list' field indicates A and B.

The BS transmits the first S-SFH subpacket with the 'Number of CSG ID' field and the second S-SFH subpacket with the 'CSG ID list' field to the MS. After determining from an advanced preamble whether the BS is a femtocell BS, the MS determines the number of CSG IDs that the femtocell BS has based on the 'Number of CSG ID' field in the first S-SFH subpacket and acquires the CSG IDs from the 'CSG ID list' field in the second S-SFH subpacket.

Irrespective of the type of the BS, the S-SFH includes the 'Number of CSG ID' field and the 'CSG ID list' field. Thus the 'Number of CSG ID' field and the 'CSG ID list' field are added to an S-SFH transmitted by a macro BS and an Open Subscriber Group (OSG) femtocell BS which do not have a CSG ID, thereby wasting resources.

In this context, another embodiment of the present invention is contemplated, in which a femtocell BS adds the 'Number of CSG ID' field and the 'CSG ID list' field to an S-SFH according to its BS type.

The SFH includes a 'BS Type' field indicating the type of a BS. For example, the 'BS Type' field may indicate a macro BS, an OSG femtocell BS, or a CSG femtocell BS. The 'BS Type' field may be included in a Primary-SFH (P-SFH) or an S-SFH. If the 'BS Type' field is included in a P-SFH, the MS may identify the type of a BS by decoding only the P-SFH without decoding the S-SFH.

The femtocell BS adds the 'Number of CSG ID' field to the first S-SFH subpacket and the 'CSG ID list' field to the second S-SFH subpacket, only if the BS type is CSG femtocell BS. The 'Number of CSG ID' field indicates the number of CSG IDs that the femtocell BS has, and the 'CSG ID list' field indicates a list of the CSG IDs. The length of the 'CSG ID list' field depends on a value of the 'Number of CSG ID' field.

The MS may be aware from the 'BS Type' field whether the 'Number of CSG ID' field and the 'CSG ID list' field are included in the S-SFH.

If the 'BS Type' field indicates a macro BS or an OSG femtocell BS, the 'Number of CSG ID' field and the 'CSG ID list' field are not present. If the femtocell BS has CSG ID A, the 'BS Type' field indicates CSG femtocell BS, the 'Number of CSG ID' field is set to 1, and the 'CSG ID list' field indicates A. If the femtocell BS has CSG ID A and CSG ID B, the 'BS Type' field indicates CSG femtocell BS, the 'Number of CSG ID' field is set to 2, and the 'CSG ID list' field indicates A and B.

The BS transmits to the MS the S-SFH or P-SFH including the 'BS Type' field, the first S-SFH subpacket including the 'Number of CSG ID' field, and the second S-SFH subpacket including the 'CSG ID list' field. Thus the MS determines from an advanced preamble whether the BS is a femtocell BS, determines from the 'BS Type' field whether the femtocell BS is CSG femtocell BS, identifies the number of CSG IDs of the femtocell BS from the 'Number of CSG ID' field, and acquires the CSG IDs from the 'CSG ID list' field.

In accordance with a further embodiment of the present invention, only if the femtocell BS is a CSG femtocell BS, the femtocell BS adds the 'Number of CSG ID' field and the 'CSG ID' field to the first S-SFH subpacket and the 'CSG ID list' field to the second S-SFH subpacket. The 'BS Type' field indicating the type of the femtocell BS may be included in the P-SFH or the S-SFH.

The 'CSG ID' field indicates one of CSG IDs that the femtocell BS has, and the 'CSG ID list' field indicates the other CSG IDs except for the CSG ID indicated by the 'CSG ID' field among the CSG IDs that the femtocell BS has. For example, if the femtocell BS has CSG IDs A, B and C, the 'Number of CSG ID' field is 3, the 'CSG ID' field indicates A, and the 'CSG ID list' field indicates B and C.

If the 'BS Type' field indicates macro BS or OSG femtocell BS, the 'Number of CSG ID', 'CSG ID' and 'CSG ID list' fields are absent. If the femtocell BS has CSG ID A, the 'BS Type' field indicates CSG femtocell BS, the 'Number of CSG ID' field is set to 1, the 'CSG ID' field indicates A, and the 'CSG ID list' field is absent.

Since the 'Number of CSG ID' and 'CSG ID' fields are added to the same S-SFH subpacket, when the femtocell BS has a single CSG ID, the MS has only to decode the S-SFH subpacket to thereby identify the CSG ID of the femtocell BS.

The BS transmits to the MS the S-SFH or P-SFH including the 'BS Type' field, the first S-SFH subpAcket including the 'Number of CSG ID' and 'CSG ID' fields, and the second S-SFH subpacket including the 'CSG ID list' field. Thus the MS identifies from an advanced preamble whether the BS is a femtocell BS, determines from the 'BS Type' field whether the femtocell BS is a CSG femtocell BS, identifies the number of CSG IDs of the femtocell BS from the 'Number of CSG ID' field in the first S-SFH subpacket, acquires one of the CSG IDs of the femtocell BS from the 'CSG ID' field in the first S-SFH subpacket, and acquires the other CSG IDs except for the CSG ID indicated by the 'CSG ID' field from the 'CSG ID list' in the second S-SFH subpacket.

In the above-described embodiments of the present invention, the 'Number of CSG ID' field should precede the 'CSG ID list' field, or the 'Number of CSG ID' field and the 'CSG ID list' field should be transmitted at the same time. That is, the S-SFH subpacket carrying the 'Number of CSG ID' field should be transmitted earlier than the S-SFH subpacket carrying the 'CSG ID list' field.

Some of the 'BS Type', 'Number of CSG ID', and 'CSG ID list' fields may be included in the same S-SFH subpacket.

In the case where the 'BS Type', 'Number of CSG ID', and 'CSG ID list' fields are transmitted in the same S-SFH subpacket, if the 'BS Type' field indicates macro BS or OSG femtocell BS, the 'Number of CSG ID' and 'CSG ID list' fields are not included. If the femtocell BS has CSG ID A, the 'BS Type' field indicates CSG femtocell BS, the 'Number of CSG ID' field is set to 1, and the 'CSG ID list' field indicates A. If the femtocell BS has CSG IDs A and B, the 'BS Type' field indicates CSG femtocell BS, the 'Number of CSG ID' field is set to 2, and the 'CSG ID list' field indicates A and B.

An operation for performing network entry in an MS that has received CSV IDs according to the above-described embodiments will be described with reference to FIG. 2.

Figure 2:
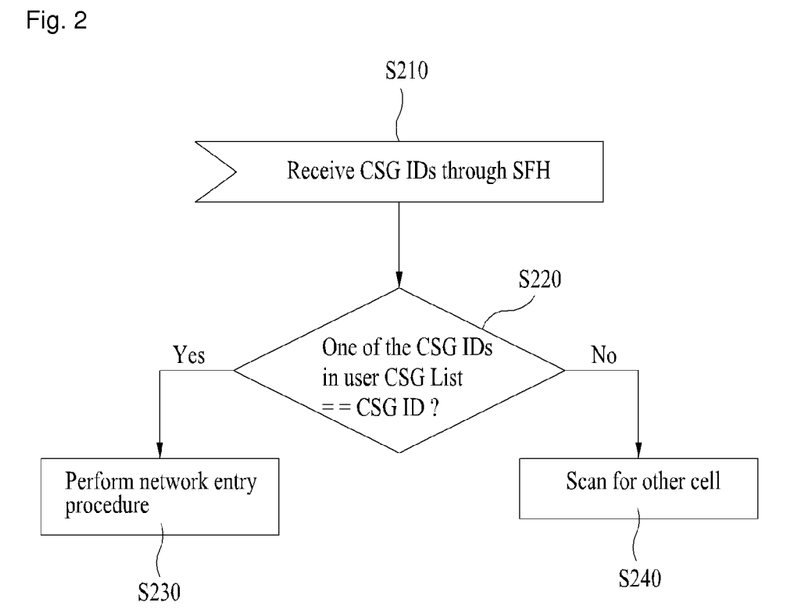
FIG. 2 is a flowchart illustrating a network entry operation of an MS according to an embodiment of the present invention.

FIG. 2 is a flowchart illustrating a network entry operation of an MS according to an embodiment of the present invention.

Referring to FIG. 2, the MS receives information about CSG IDs from a BS in an SFH in accordance with one of the above embodiments of the present invention in step S210.

The MS compares the received CSG IDs with CSG IDs listed in a user CSG list to determine whether there is any CSG ID of the user CSG ID list identical to at least one of the received CSG IDs in step S220. The user CSG list is a list of CSG IDs allocated to femtocell BSs accessible to the MS.

In the presence of a CSG ID identical to any of the received CSG IDs in the user CSG ID list, the MS performs network entry to the BS in step S230. In the absence of a CSG ID identical to any of the received CSG IDs in the user CSG ID list, the MS scans for another cell in step S240.

In the case where a new CSG ID is allocated to a femtocell accessible to MSs using a first CSG ID and MSs using a second CSG ID, a method for notifying the MSs of the new CSG ID of the femtocell according to an embodiment of the present invention will be described below with reference to FIGS. 3, 4 and 5.

Figure 3:
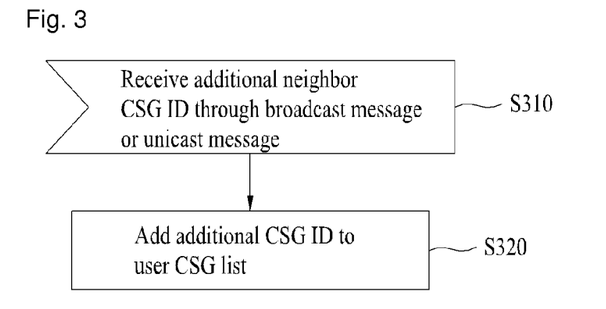
FIG. 3 is a flowchart illustrating an operation for receiving a new CSG ID allocated to a neighbor Base Station (BS) and registering the new CSG ID in a user CSG list in an MS according to an embodiment of the present invention.

FIG. 3 is a flowchart illustrating an operation for receiving a new CSG ID allocated to a neighbor cell and registering the new CSG ID in a user CSG list in an MS according to an embodiment of the present invention.

Referring to FIG. 3, the MS receives a new CSG ID allocated to a neighbor cell by a broadcast message or a unicast message in step S310 and adds the new CSG ID to a user CSG list in step S320.

In a scenario where Company B moves into a building having Company A already located therein as illustrated in FIG. 1, if a new CSG ID, CSG ID 3 is allocated to Femtocell B that workers of both Company A and Company B should access, the workers of Company A and Company B may access Femtocell B only when they are aware of the new CSG ID, CSG ID 3 allocated to Femtocell B.

Therefore, a serving BS should notify an MS of the new CSG ID, CSG ID 3 allocated to Femtocell B, which will be described with reference to FIGS. 4 and 5.

Figure 4:
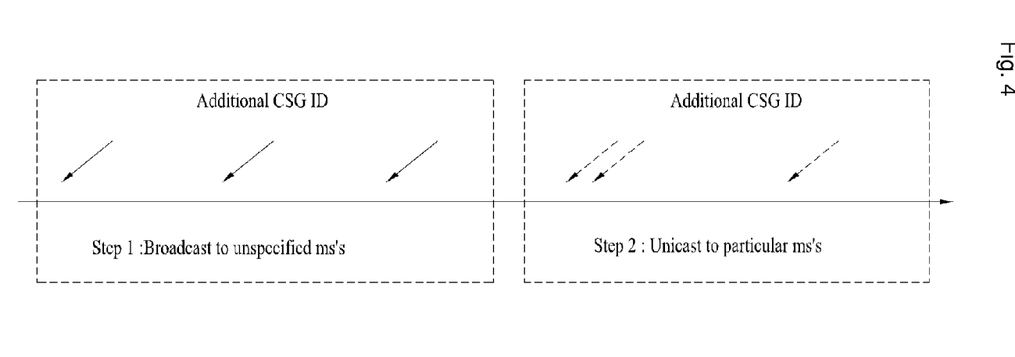
FIG. 4 illustrates a method for transmitting a new CSG ID of a neighbor BS according to an embodiment of the present invention.

FIG. 4 illustrates a method for transmitting a new CSG ID of a neighbor BS according to an embodiment of the present invention.

Referring to FIG. 4, the BS notifies the MS of the new CSG ID of the neighbor BS in two steps. First, the BS notifies unspecified MSs of the new CSG ID at the time when the new CSG ID is allocated to the neighbor BS, and then notifies particular MSs that failed to receive the new CSG ID of the neighbor BS by unicast messages.

In the step of notifying the unspecified MSs of the new CSG ID by the broadcast message, the BS transmits the broadcast message carrying the new CSG ID of the neighbor BS to all MSs within its cell for a predetermined time.

For example, Femtocell BSs A, C and D notify MSs within their cell areas of a new CSG ID allocated to Femtocell BS B, CSG ID 3 by broadcast messages.

At the same time, the BS may request the MSs to restart. The BS may transmit the new CSG ID of the neighbor BS only or along with other information about the neighbor BS.

The period of transmitting the new CSG ID of the neighbor BS from the BS may be calculated by the following equation.

Periodicity=periodicity of the S-SFH sub packet+α  [Equation 1]

(0≤α≤25 ms)

The new CSG ID transmission period may be determined based on the transmission period of the S-SFH. To reduce overhead, the new CSG ID transmission period may be determined using the transmission period of an S-SFH subpacket, which is longer than the transmission period of any other S-SFH subpacket.

During broadcasting the new CSG ID of the neighbor BS, the BS generates a list of MSs that have received the new CSG ID and a list of MSs that failed to receive the new CSG ID.

The BS then transmits the new CSG ID of the neighbor BS to the MSs that failed to receive the new CSG ID by unicast messages. The unicast messages may be MAC management messages used during initial entry, for example, Ranging Response (RNG-RSP) messages.

Figure 5:
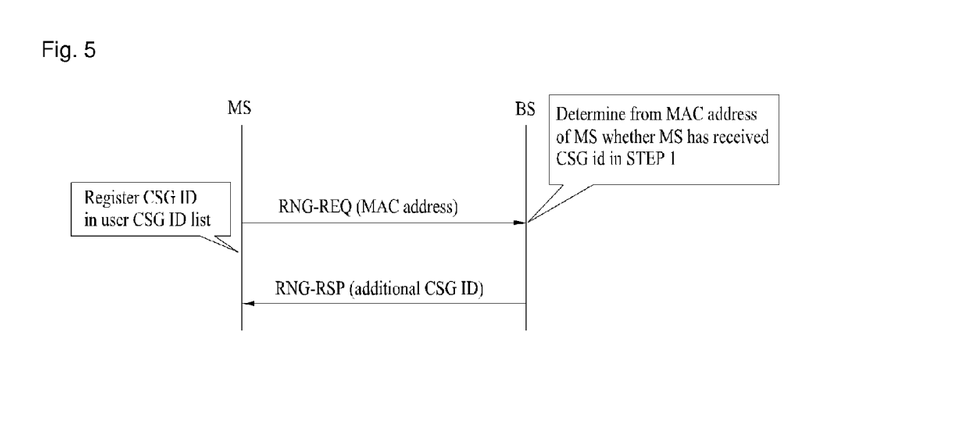
FIG. 5 is a diagram illustrating a signal flow for transmitting a new CSG ID allocated to a neighbor BS to an MS by a Ranging Response (RNG-RSP) message in a BS according to an embodiment of the present invention.

FIG. 5 is a diagram illustrating a signal flow for transmitting a new CSG ID allocated to a neighbor BS to an MS by an RNG-RSP message in a BS.

Referring to FIG. 5, upon receipt of a ranging Request (RNG-REQ) message from the MS, the BS determines whether the MS failed to receive the new CSG ID of the neighbor BS. Specifically, the BS determines whether the MAC address of the MS is in a list of MSs that have received the new CSG ID of the neighbor BS. If determining that the MS failed to receive the new CSG ID of the neighbor BS, the BS transmits an RNG-RSP message including the new CSG ID of the neighbor BS to the MS. Thus the MS registers the new CSG ID of the neighbor BS to its user CSG list.

Then the MS moves to the neighbor BS and performs network entry to the neighbor BS. To be more specific, the MS acquires the CSG IDs of the neighbor BS by receiving an SFH from the neighbor BS and determines whether any of the received CSG IDs is included in the user CSG list. If the MS has already received a CSG ID of the neighbor BS by a unicast message and registered the received CSG ID to the user CSG list, the CSG ID of the neighbor BS is present in the user CSG list. Hence, the MS performs initial entry to the neighbor BS.

Figure 6:
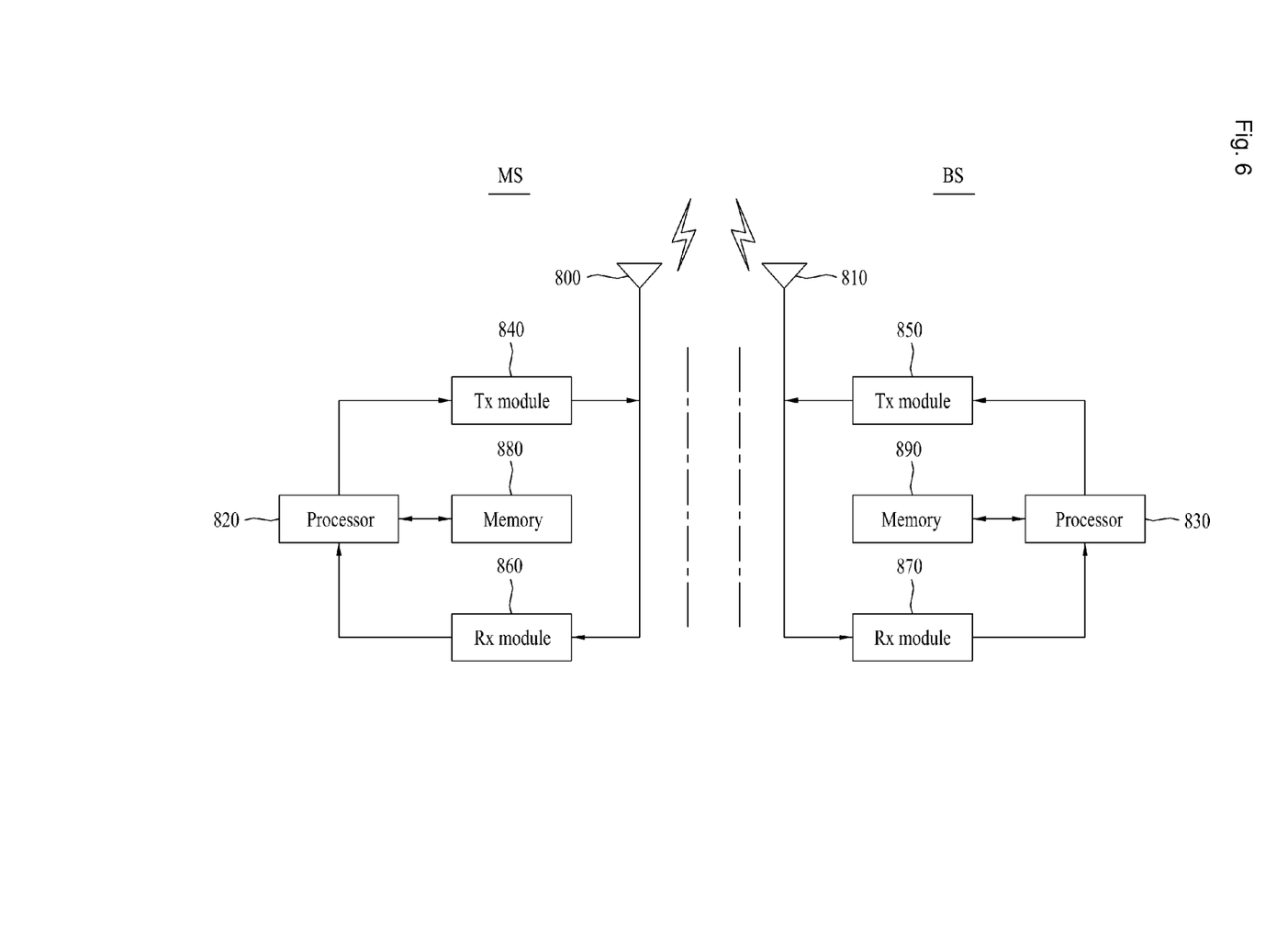
FIG. 6 is a block diagram of an MS and a BS for implementing the above-described embodiments of the present invention, according to an embodiment of the present invention.

FIG. 6 is a block diagram of an MS (or Advanced MS (AMS)) and a BS (or Advanced BS (ABS)) for implementing the above-described embodiments of the present invention, according to an embodiment of the present invention.

Referring to FIG. 6, each of the MS and the BS includes an antenna 800 or 810 for transmitting and receiving information, data, signals and/or messages, a Transmission (Tx) module 840 or 850 for transmitting a messages by controlling the antenna 800 or 810, a Reception (RX) module 860 or 870 for receiving a message by controlling the antenna 800 or 810, a memory 880 or 890 for storing information related to communication between the MS and the BS, and a processor 820 or 830 for controlling the Tx module 840 or 850, the Rx module 860 or 870, and the memory 880 or 890. The BS may be a femto BS or a macro BS.

The antennas 800 and 810 externally transmit signals generated from the TX modules 840 and 850 or output received external Radio Frequency (RF) signals to the RX modules 860 and 870. When Multiple Input Multiple Output (MIMO) is supported, two or more antennas may be used.

The processors 820 and 830 provide overall control to the MS and the BS. Particularly, the processors 820 and 830 may perform a control function for implementing the embodiments of the present invention, a variable MAC frame control function based on service characteristics and a propagation environment, a handover function, and an authentication and encryption function. Each of the processors 820 and 830 may further include an encryption module for encrypting various messages and a timer for controlling transmission and reception of various messages.

The Tx modules 840 and 850 may encode and modulate transmission signals and/or data scheduled by the processors 820 and 830 in a predetermined coding and modulation scheme and outputs the modulated signals and/or data to the antennas 800 and 810.

The Rx modules 860 and 870 may recover the original data by decoding and modulating RF signals received through the antennas 800 and 810 and thus may provide the original data to the processors 820 and 830.

The memories 880 and 890 may store programs for processing and control operations of the processors 820 and 830 and temporarily store input/output data. For example, the memory 880 of the MS may temporarily store an uplink grant, system information, a Station ID (STID), a Flow ID (FID), action time information, resource allocation information, and frame offset information, which are received from the BS.

Also, each of the memories 880 and 890 may include at least one of a flash memory-type storage medium, a hard disc-type storage medium, a multimedia card micro-type storage medium, a card-type memory (e.g. an Secure Digital (SD) or extreme Digital (XS) memory), a Random Access Memory (RAM), a Read-Only Memory (ROM), an Electrically Erasable Programmable Read-Only Memory, a Programmable Read-Only Memory, a magnetic memory, a magnetic disc, and optical disk.

Mode for the Invention

Various embodiments have been described in the best mode for carrying out the invention.

Industrial Applicability

The present invention provides is applicable to a wireless communication system. More particularly, the present invention is applicable to a method for transmitting a CSG ID in a wireless communication system.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods for transmitting a CSG ID in a wireless communication system according to the embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for transmitting at least one Closed Subscriber Group (CSG) Identifier (ID) in a Base Station (BS) in a wireless communication system including femtocells, the method comprising:
   including information about a number of one or more CSG IDs that the BS has and information about a list of the one or more CSG IDs in a Secondary-SuperFrame Header (S-SFH); and
   transmitting the S-SFR,
   wherein the information about the number of one or more CSG IDs that the BS has and the information about the list of the one or more CSG IDs are included in different S-SFH subpackets.

2. The method according to claim 1, wherein the including information comprises including the information about the number of one or more CSG IDs that the BS has and the information about the list of the one or more CSG IDs in the S-SFH, only if a type of the BS is a CSG femtocell BS.

3. The method according to claim 1, wherein the transmitting the S-SFH comprises transmitting the S-SFH subpacket carrying the information about the number of one or more CSG IDs that the BS has earlier than the S-SFH subpacket carrying the information about the list of the one or more CSG IDs.

4. The method according to claim 1, wherein the S-SFH subpacket carrying the information about the number of one or more CSG IDs that the BS has includes one of the one or more CSG IDs, and the list of the one or more CSG IDs does not include the CSG ID included in the S-SFH subpacket carrying the information about the number of one or more CSG IDs.

5. A method for receiving at least one Closed Subscriber Group (CSG) Identifier (ID) in a Mobile Station (MS) in a wireless communication system including femtocells, the method comprising:
   receiving from a Base Station (BS) a Secondary-SuperFrame Header (S-SFH) including information about a number of one or more CSG IDs that the BS has and information about a list of the one or more CSG IDs; and
   performing network entry based on the information about the list of the one or more CSG IDs,
   wherein the information about the number of one or more CSG IDs that the BS has and the information about the list of the one or more CSG IDs are included in different S-SFH subpackets.

6. The method according to claim 5, wherein the receiving comprises receiving the S-SFH subpacket carrying the information about the number of one or more CSG IDs that the BS has earlier than the S-SFH subpacket carrying the information about the list of the one or more CSG IDs.

7. The method according to claim 5, wherein the S-SFH subpacket carrying the information about the number of one or more CSG IDs that the BS has includes one of the one or more CSG IDs, and the list of the one or more CSG IDs does not include the CSG ID included in the S-SFH subpacket carrying the information about the number of one or more CSG IDs.

8. The method according to claim 5, wherein the performing network entry comprises, if any of the received one or more CSG IDs is included in a list of CSG IDs of femtocell BSs accessible to the MS, performing the network entry to the BS.

* * * * *